Figure 1:
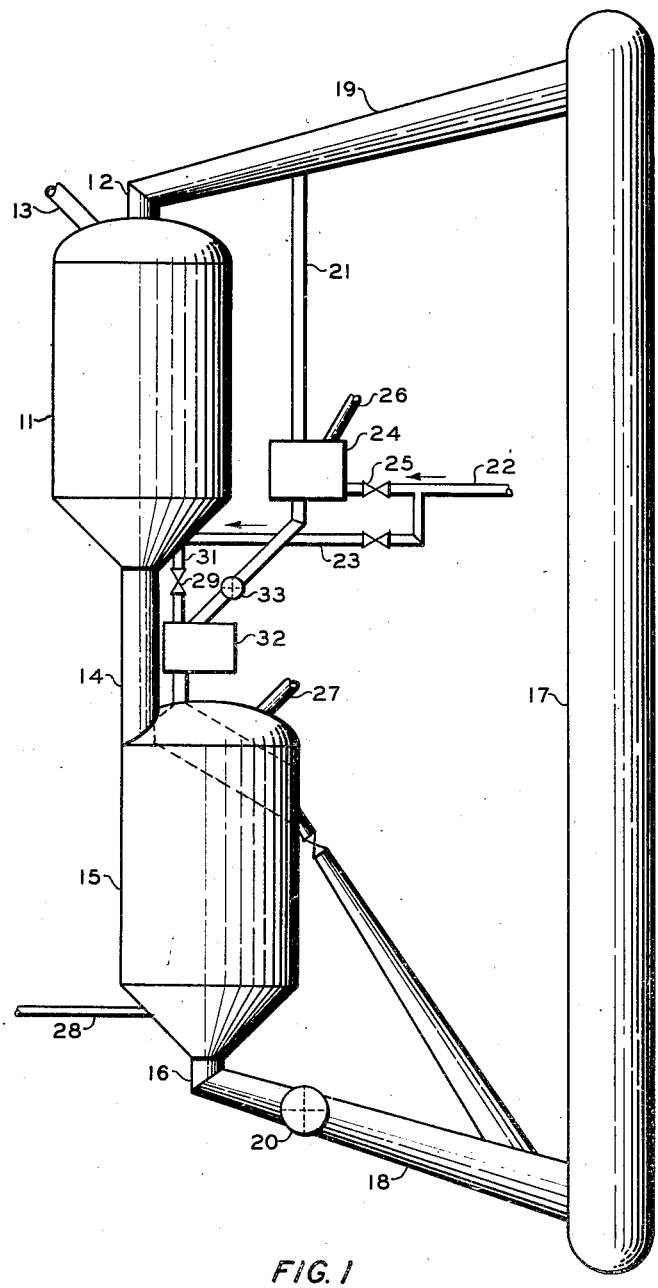

May 22, 1951  H. J. HEPP  2,554,407
HYDROCARBON CONVERSION IN A PEBBLE HEAT EXCHANGER
Filed June 6, 1949  2 Sheets-Sheet 1

INVENTOR.
H. J. HEPP
BY Hudson and Young
ATTORNEYS

May 22, 1951     H. J. HEPP     2,554,407

HYDROCARBON CONVERSION IN A PEBBLE HEAT EXCHANGER

Filed June 6, 1949     2 Sheets-Sheet 2

INVENTOR.
H. J. HEPP
BY Hudson and Young
ATTORNEYS

Patented May 22, 1951

2,554,407

UNITED STATES PATENT OFFICE 2,554,407

HYDROCARBON CONVERSION IN A PEBBLE HEAT EXCHANGER

Harold J. Hepp, Bartlesville, Okla., assignor to Phillips Petroleum Company, a corporation of Delaware Application June 6, 1949, Serial No. 97,342

11 Claims. (Cl. 260—677)

This invention relates to pebble heat exchangers. In one of its more specific aspects it relates to a fluent solid material quench for reaction products in pebble heater apparatus. In another of its more specific aspects it relates to a method for preventing carbon laydown in reaction chambers of pebble heater apparatus.

Thermal conversion processes which are carried out in so-called pebble heater apparatus utilize a fluent mass of solid heat exchange material which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact the gaseous reactant materials in a second direct heat exchange relation, furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are passed upwardly through the cylindrical bed, sometimes being introduced thereinto at the periphery of the bed and at its lower end, and are sometimes introduced through a refractory arch which supports the moving pebble bed. At other times, heat is supplied to the heating chamber by supplying a fuel to the lower portion of the pebble bed within the heater chamber and burning the fuel on the surface of the pebbles so as to heat the pebbles by combustion and further heating the pebbles by passing the resulting combustion gas upwardly through the downflowing fluent mass of pebbles. The heated pebbles are introduced into the upper portion of a reaction chamber and reactant materials are introduced into the lower portion of the reaction chamber and are caused to flow upwardly through the downflowing fluent hot pebble mass therein, thereby obtaining the heat required for thermal conversion of the reactant materials. Reaction products are removed from the upper portion of the reaction chamber generally at points above the top surface of the pebble bed. One disadvantage of the use of pebble heater apparatus for the conversion of hydrocarbon materials is the fact that the reaction products tend to accumulate in the space above the pebble bed and adjacent the surface of the reaction chamber and decompose so as to lay down carbon on the reaction chamber surface. The accumulation of carbon on the reaction chamber surface finally reaches such proportions as to seriously interfere with the removal of reaction products through the effluent outlet of the reaction chamber. Additional trouble is encountered when large fragments of the accumulated carbon separate from the surface of the reaction chamber and pass downwardly through the chamber with the fluent mass of pebbles and become lodged in the pebble outlet of the chamber, thus reducing or preventing the flow of pebbles through the pebble heater apparatus.

Broadly speaking, this invention includes a means and method whereby the accumulation of carbon in the upper portion of the reaction chamber is substantially prevented by the formation of a fluent quench in the upper portion of the reaction chamber. A layer of solid heat exchange material at a temperature lower than that utilized in the reaction of the reactant materials is provided so as to cover at least part of the top surface of the pebble bed within the reaction chamber and the reaction products are caused to pass therethrough so as to be quenched and to cause the condensation of tarry material from the products on the surface of the pebbles. The invention is particularly adapted to processes for cracking hydrocarbons, such as ethane and/or propane at temperatures of between 1400° F. and 1700° F.

Solid heat exchange material which is conventionally used in pebble heater apparatus is generally called "pebbles." The term pebbles as used herein denotes any solid refractory material of flowable size and form, having strength, which is suitable to carry large amounts of heat from the pebble heating chamber to the reaction chamber without rapid deterioration or substantial breaking. Pebbles conventionally used in pebble heater apparatus are substantially spherical in shape and range from about ⅛ inch to about 1 inch in diameter. In a high temperature process pebbles having a diameter of between about ¼ and ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material, may be utilized to form such pebbles. Silicon carbide, alumina, periclase, thoria, beryllia, Stellite, zirconia, and mullite may be satisfactorily used to form such pebbles or may be used in admixture with each other or with other materials. Pebbles formed of such materials, when properly fired, serve very well in high temperatures. Some pebbles, such as mullite-alumina pebbles, withstand temperatures up to about 3500° F. Pebbles which are used may be either inert or catalytic, as used in any selected process.

An object of this invention is to provide an improved method for operation of pebble heater apparatus. Another object of the invention is to provide improved means for quenching reaction products in pebble heater apparatus. Another object of the invention is to provide means for preventing the formation of coke adjacent reaction product outlets of reaction chambers of pebble heater apparatus. Another object of the invention is to provide an improved method for removing tarry material from reaction products. Another object of the invention is to provide an improved pebble heater apparatus. Other and further objects and advantages will be apparent to those skilled in the art upon study of the accompanying discussion and the drawings.

Figures 2, 3, 4:
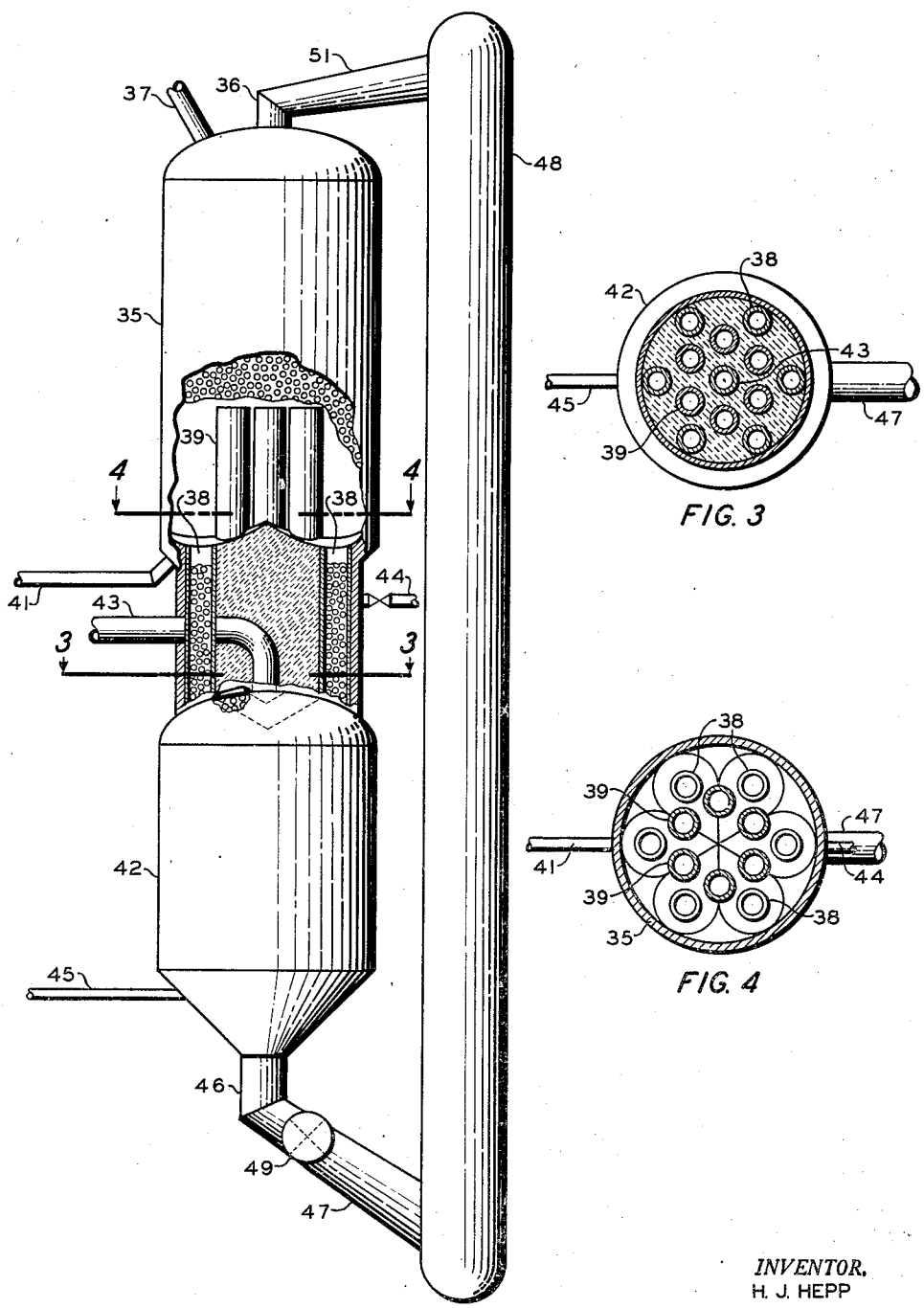

Understanding of the invention will be facilitated upon reference to the diagrammatic drawings in which Figure 1 is a schematic elevation of a pebble heater apparatus of this invention. Figure 2 is a schematic elevation, partly in section, of a preferred modification of the pebble heater apparatus of this invention. Figure 3 is a horizontal cross-section taken on the line 3—3 of Figure 2. Figure 4 is a horizontal cross-section taken on the line 4—4 of Figure 2.

Referring particularly to Figure 1 of the drawing, pebble heater chamber 11 is provided in its upper portion with a pebble inlet conduit 12 and an effluent outlet conduit 13. Pebble outlet conduit 14 extends between the lower portion of pebble heater chamber 11 and the upper portion of reaction chamber 15. Pebble outlet conduit 16 is provided in the lower portion of reaction chamber 15 and communicates with elevator 17 by means of pebble conduit 18. Elevator 17 communicates with pebble inlet conduit 12 in the upper portion of heater chamber 11 by means of pebble conduit 19. Pebble feeder 20 is provided in conduit 18 to control the flow of pebbles therethrough. Pebble conduit 21 extends between pebble conduit 19 and the upper portion of reaction chamber 15 at a point adjacent pebble outlet conduit 14, but intermediate pebble outlet conduit 14 and the axis of reaction chamber 15. Pebble outlet conduit 14 extends into reaction chamber 15 at a point adjacent the sidewall of that chamber.

Hot gas or fuel is supplied to the lower portion of heater chamber 11 by means of conduit 22 and conduit 23. A portion of the hot gas or fuel is, in one modification of the invention, supplied to the lower portion of pebble heater chamber 24 through conduit 22 and valve 25. Effluent outlet conduit 26 is provided in the upper portion of pebble heater chamber 24 and effluent outlet conduit 27 is provided in the upper portion of reaction chamber 15, preferably at the side of the chamber opposite the pebble inlets thereto and above the surface of the pebble bed which is formed by the supply of pebbles to the reaction chamber through pebble outlet conduit 14 and pebble conduit 21. Reactant material inlet conduit 28 is provided in the lower portion of reaction chamber 15. Although the schematic drawing shows conduits 23 and 28 entering pebble heater chamber 11 and reaction chamber 15, respectively, at single points, it is within the scope of this invention to provide communication between those conduits and their respective chambers by means of headers which may encircle the bottom portions of those chambers and communicate with the interior of the chambers through a plurality of inlets. In another modification of the invention, valve 25 is closed and valve 29 in pebble conduit 31 is opened so as to allow the withdrawal of a portion of the heated pebbles from pebble heater chamber 11 to mixing chamber 32. Pebble feeder 33 is provided in pebble conduit 21 so as to control the flow of pebbles therethrough. Pebble feeders 20 and 33, although diagrammatically shown in the drawing as being star valves, may be either table type controllers or slide valves.

In the operation of the device shown as Figure 1 of the drawing, pebbles are passed through pebble inlet conduit 12 to the upper portion of pebble heater chamber 11 so as to form a fluent gas-pervious contiguous mass within the heater chamber. Hot gas or fuel is supplied to the lower portion of heater chamber 11 and the hot gas is passed upwardly through the fluent pebble mass in direct heat exchange therewith so as to heat the pebbles therein to a high temperature. If fuel is supplied to the lower portion of the pebble heater chamber, the fuel is burned on the surface of the pebbles, whereby the pebbles are raised to a high temperature and the resulting hot combustion gases are passed upwardly through the fluent pebble mass so as to preheat the pebbles in the upper portion of the pebble bed. Effluent material is removed from the upper portion of pebble heater chamber 11 through effluent outlet conduit 13. Hot pebbles are withdrawn from the lower portion of pebble heater chamber 11 and are passed into the upper portion of reaction chamber 15 at a point adjacent the wall of that chamber.

The pebbles form a fluent, gas-pervious, contiguous mass within reaction chamber 15. Pebbles which are supplied to reaction chamber 15 through pebble outlet conduit 14 tend to assume the angle of repose which is that angle from the horizontal the top of a mass of pebbles will assume when poured from a central outlet. A portion of the cool pebbles which are passed through pebble conduit 19 are withdrawn through pebble conduit 21 and passed through pebble heater chamber 24 where they are raised to a temperature between 10° F. and 200° F. below the temperature of the pebbles withdrawn from the lower portion of pebble heater chamber 11. Pebbles from pebble heater chamber 24 are passed into the upper portion of reaction chamber 15 at a point adjacent pebble outlet conduit 14 in the upper portion of reaction chamber 15, but intermediate conduit 14 and the axis of the reaction chamber. Pebbles from pebble conduit 21 also tend to assume the angle of repose but form a cooler blanket over the surface of the hotter pebbles in the upper portion of the reaction chamber. The temperature of the pebbles within pebble heater chamber 24 is controlled by the operation of valve 25 which controls the flow of heating gas or fuel through conduit 22. Effluent heating gas is removed from the upper portion of pebble heater chamber 24 through effluent outlet conduit 26. The flow of cooler pebbles through conduit 21 is controlled by the action of feeder 33 which may be actuated in response to the temperature of the pebbles supplied to reaction chamber 15 through pebble outlet conduit 14.

In an above mentioned modification of the invention, a portion of the hot pebbles is withdrawn from the lower portion of pebble heater chamber 11 through conduit 31 and is passed into mixing chamber 32. Valve 25 is closed and the pebbles withdrawn through conduit 21 are passed into mixing chamber 32 where they are mixed with the hot pebbles from pebble heater chamber 11 and are heated by the direct heat exchange therewith to a temperature between 10° F. and 200° F. lower than the temperature of the pebbles withdrawn from the lower portion of pebble heater chamber 11. It is preferred that the cooler pebbles which are supplied to the upper portion of reaction chamber 15 be at a temperature between 50° F. and 100° F. below that of the temperature of the pebbles withdrawn from the lower portion of heater chamber 11. The pebbles from mixing chamber 32 are supplied to the upper portion of reaction chamber 15 through a continuation of conduit 21.

Reactant materials are supplied to the lower portion of reaction chamber 15 through reactant material inlet conduit 28 and pass upwardly through the reaction chamber in direct heat exchange with the hot pebbles therein. The hot pebbles supply the heat necessary for the reaction of the reactant materials. Reaction products pass upwardly through the cooler layer of pebbles on the upper surface of the pebble bed and are quenched in a direct heat exchange therewith, whereby tarry materials are condensed on the surface of the pebbles and pass downwardly through the pebble bed with those pebbles. The quenched reaction products are removed from the upper portion of reaction chamber 15 through effluent outlet conduit 27. The cooler layer of pebbles has the added advantage that it reduces the amount of radiant heat to which the surface of the reaction chamber adjacent the effluent outlet is subjected. The temperature of the surface of that portion of the reaction chamber is substantially that of the quenched effluent reaction products. The cool pebble layer moves downwardly with the hotter pebble mass and is heated in a direct heat exchange therewith. Pebbles cooled during reaction of the reaction materials are removed from the lower portion of reaction chamber 15 through outlet conduit 16 and are passed by means of pebble conduit 18, elevator 17, and pebble conduit 19 to the upper portion of pebble heater chamber 11 and to pebble conduit 21.

In the device shown in Figure 2 of the drawing, pebble heater chamber 35 is provided in its upper portion with pebble inlet conduit 36 and gas effluent outlet conduit 37. A set of first pebble outlets 38 is provided in the bottom of pebble heater chamber 35 along a line about the interior of the pebble heater chamber, the first pebble outlets being closer to the periphery of the chamber than to its axis. The disposition of first outlet conduits 38 will be more apparent upon reference to Figure 4 of the drawing. A plurality of second outlet conduits 39 is provided along a line about the interior of the pebble heater chamber, the second outlets being positioned between the first pebble outlets and the axis of the pebble heater chamber. The position of second outlet conduits 39 will also be more apparent upon reference to Figure 4 of the drawing. Outlet conduits 39 extend upwardly into the interior of pebble heater chamber 35 to points intermediate its ends. Heating material inlet conduit 41 is provided in the lower portion of pebble heater chamber 35 and, as explained in connection with the device shown in Figure 1 of the drawing, the heating material inlet conduit may communicate with the interior of pebble heater chamber 35 at a plurality of points by means of a header member, not shown.

Reaction chamber 42 is provided below heater chamber 35 and first outlet conduits 38 extend downwardly from the bottom of chamber 35 to the upper portion of reaction chamber 42 at points adjacent and spaced about the wall of that chamber. Second outlet conduits 39 also extend downwardly to the upper portion of reaction chamber 42 to points intermediate first outlet conduits 38 and the axis of reaction chamber 42. Effluent outlet conduit 43 extends axially from the upper portion of reaction chamber 42 and outwardly to the exterior of the pebble heater apparatus and is surrounded at its inlet and by a plurality of second outlet conduits 39. Coolant conduit 44 is provided intermediate heater chamber 35 and reaction chamber 42 and communicates with second outlet conduits 39. Reaction material inlet conduit 45 extends into the lower portion of reaction chamber 42. Conduit 45 may also communicate with the lower portion of reaction chamber 42 at a plurality of points by means of a header member, not shown. Reaction chamber 42 is provided in its lower portion with pebble outlet conduit 46. Pebble conduit 47 extends between pebble outlet conduit 46 and the lower portion of elevator 48. Pebble feeder 49 is provided in pebble conduit 47 so as to control the pebble flow through the reaction chamber. Pebble conduit 51 extends between the upper portion of elevator 48 and pebble inlet conduit 36 in the upper portion of pebble heater chamber 35.

In the operation of the device shown in Figure 2 of the drawings, pebbles are inserted into the upper portion of pebble heater chamber 35 through pebble inlet conduit 36. The pebbles form a fluent gas-pervious mass within pebble heater chamber 35 and flow downwardly therethrough. Hot gas or fuel is injected into the lower portion of pebble heater chamber 35 through conduit 41. Heating within chamber 35 takes place in the same manner as described in connection with pebble heater chamber 11. Pebbles in the upper portion of pebble heater chamber 35 are preheated by the hot gases passing upwardly therethrough and the pebbles which reach the bottom of chamber 35 attain the highest temperature within heater chamber 35. Pebbles are withdrawn through first outlet conduits 38 and are supplied to the upper portion of reaction chamber 42 at points adjacent the periphery of that chamber. The pebbles flow downwardly and inwardly from the pebble inlets to form a fluent, gas-pervious pebble mass within the reaction chamber. The flow of the pebbles from the pebble conduits is such as to form a hollow inverted cone in the upper portion of the reaction chamber. The outlets of second outlet conduits 39 are within the hollow inverted cone in the reaction chamber. Pebbles which are at a cooler temperature than those which are withdrawn from pebble heater chamber 35 through outlets 38 are withdrawn from points intermediate the ends of pebble heater chamber 35 through conduits 39. The cooler pebbles are passed into the hollow cone portion formed within reaction chamber 42 and form a cooler pebble blanket over the top surface of the hotter pebble bed portion. The temperature differential which is maintained between the hotter and cooler pebbles is between 10° F. and 200° F., preferably between 50° F. and 100° F.

Reaction materials are supplied to the lower portion of reaction chamber 42 through reactant material inlet conduit 45. The reactant materials flow upwardly through reaction chamber 42 in direct heat exchange relation with the hot pebbles within chamber 42. The hot pebbles supply sufficient heat to cause the reaction of the reactant materials. The reaction products flow upwardly through chamber 42 and escape from the pebble mass by filtering through the cooler pebble mass formed in the top of the hotter pebble bed. The reaction products are quenched in the direct heat exchange with the cooler pebbles and tarry materials are condensed from the reaction products onto the surface of the cooler pebbles.

Flow of pebbles through the pebble heater apparatus is controlled by feeder member 49. Feeder member 49 may be actuated in response to any number of variables of the pebble heater system. In one modification, controller 49 is actuated in response to the temperature of pebbles removed from the lower portion of reaction chamber 42 through pebble outlet conduit 46. The cool pebbles from the lower portion of chamber 42 are passed by means of pebble conduit 47, elevator 48, and pebble conduit 51 to pebble inlet conduit 36 in the upper portion of pebble heater chamber 35. The temperature differential between the hotter and cooler pebbles which are supplied to the upper portion of heater chamber 42 is controlled by the volume of heating gas or fuel which is supplied to the lower portion of chamber 35 through heating material inlet conduit 41 and by the supply of a coolant, such as water or steam, to second outlet conduits 39 through conduit 44. The use of cooling gas is especially desirable when it is necessary to maintain the temperature differential between the hotter and cooler pebbles close to the upper limit of the temperature differential temperature range recited above.

In order to substantially eliminate stagnant pebble areas in the bottom portion of pebble heater chamber 35, horizontal pear-shaped cavities are formed in the bottom of the pebble heater chamber extending from the axis of that chamber to its periphery. First outlet conduits 38 are positioned in the lower portion of the cavities so that pebbles are substantially funneled into conduits 38. Second conduits 39 are positioned on radii intermediate the radii upon which conduits 38 are positioned. Conduits 39 therefore are generally positioned on the ridges formed between the pear-shaped cavities and extend upwardly and downwardly therefrom.

Normally the introduction of the cooler pebbles in the manner described above will have little effect on the thermal efficiency of the process. The ratio of the hotter to the cooler pebbles will vary within the range of 1:1 to 10:1. It is necessary, however, that the volume of the cooler pebbles be such as to provide a filtering action to the reaction product. Another modification of the invention shown in Figure 1 of the drawings is the provision of a pebble outlet in the side of the reaction chamber opposite that at which pebble outlet conduit 14 communicates with the upper portion of reaction chamber 15. The pebble outlet in the side of the reaction chamber 15 is preferably positioned below the angle of repose taken from the pebble outlet end of conduit 14 in the upper portion of chamber 15. The provision of this side pebble outlet makes possible a more rapid flow of cooler pebbles across the top surface of the pebble bed. In this manner of operation it is possible to maintain the temperature differential at a point in the neighborhood of its upper limits without utilizing an inert cooling gas. In such a modification, the ratio of hot to cool pebbles may range in the vicinity of the ratio of 1:1.

The pebbles throughout the length of the heater chamber, connecting conduits, and reaction chamber are maintained as a contiguous mass. Additional heat may be obtained in the pebble heater chamber by passing an oxygen-supplying gas in excess of that required for supplied fuel, into the lower portion of the heater chamber. Carbon which results from the decomposition of tarry material deposited on the cooler pebbles is oxidized and gives off heat in the heater chamber.

Another modification which is within the scope of this invention provides a screen in the side of the cool pebble conduits. Effluent reaction products may be withdrawn through the side of the cool pebble conduits. The screens, of necessity, however, will have to be positioned close to the outlet of those pebble conduits so as to minimize the choking effect which pebbles flowing through a constricted area have on the flow of gas.

Various other modifications will be apparent to those skilled in the art upon study of the accompanying disclosure. Such modifications may be made without departing from the spirit and the scope of the disclosure. One such modification is the sealing of pebble conduits at each end of the reaction chamber by a gas, such as steam, which is inert to the reaction.

I claim:

1. An improved method of reacting hydrocarbons which comprises heating a first fluent mass of pebbles in a pebble heating zone; passing said pebbles into the upper portion of a reaction zone and downwardly therein; passing a second fluent mass of pebbles at a lower temperature than said first pebble mass into the upper portion of said reaction zone as a cooler top pebble layer on said hotter first pebble mass; passing a hydrocarbon reactant material into the lower portion of said reaction zone and upwardly therethrough in direct heat exchange with said pebbles therein; passing reaction products only through a moving mass of pebbles until they have filtered through said cooler top layer of pebbles, whereby tarry materials are condensed from said reaction products and are deposited on said cooler pebbles; removing said reaction products from the upper portion of said reaction zone; removing said pebbles from the lower portion of said reaction zone; and passing at least a portion of said pebbles into the upper portion of said pebble heating zone.

2. An improved method of reacting hydrocarbons which comprises the steps of passing a first fluent mass of pebbles into the upper portion of a pebble heating zone and gravitating them downwardly therethrough; passing a hot gaseous material upwardly through said pebble heating zone in direct heat exchange with said first fluent pebble mass; removing effluent material from the upper portion of said pebble heating zone; gravitating said first fluent pebble mass into the upper portion of a reaction chamber and downwardly therethrough; heating a second fluent pebble mass to a temperature between 10° F. and 200° F. below the temperature of said first fluent pebble mass removed from the bottom of said pebble heating zone; gravitating said second fluent pebble mass into the upper portion of said reaction zone as a cooler top pebble layer on said hotter first pebble mass; passing a gaseous hydrocarbon reactant material into the lower portion of said reaction zone and upwardly therethrough in direct heat exchange with said pebbles therein; passing reaction products only through a moving mass of pebbles until they have filtered through said cooler layer of pebbles, whereby tarry materials are condensed from said reaction products and are deposited on said cool pebbles; removing said reaction products from the upper portion of said reaction zone; removing said pebbles from the lower portion of said reaction zone; and elevating said pebbles to the upper portion of said pebble heating zone.

3. The method of claim 2, wherein said second fluent pebble mass is passed into the upper portion of said pebble heating zone together with said first fluent pebble mass; heating both pebble masses in direct heat exchange with a hot gaseous material in said pebble heating zone; gravitating said first fluent pebble mass from the bottom of said pebble heating zone into the upper portion of said reaction zone; gravitating said second fluent pebble mass from a position intermediate the ends of said heating zone, at a temperature between 50° F. and 100° F. below the temperature of said first fluent pebble mass, into the upper portion of said reaction zone as a cooler pebble layer on said hotter first pebble mass.

4. The method of claim 2, wherein said second fluent pebble mass is withdrawn from said elevated pebbles before they enter said pebble heating; and heating said second fluent pebble mass separately from said first fluent pebble mass to a temperature between 50° F. and 100° F. below the temperature of said first fluent pebble mass.

5. An improved method of reacting hydrocarbons which comprises heating a first fluent mass of pebbles in a pebble heating zone; passing said first pebbles into the upper portion and adjacent the side of a reaction zone; passing a second fluent mass of pebbles at a temperature lower than said first pebble mass into the upper portion of said reaction zone intermediate said first pebble mass inlet and the axis of said reaction zone, whereby a cooler top pebble layer is formed on said hotter first pebble mass; passing a gaseous hydrocarbon reactant material into the lower portion of said reaction zone and upwardly therethrough in direct heat exchange with said pebbles therein; passing reaction products only through a moving mass of pebbles until they have filtered through said cooler layer of pebbles, whereby tarry materials are condensed from said reaction products and are deposited on said cooler pebbles; removing said reaction products from the upper portion of said reaction zone; removing said pebbles from the lower portion of said reaction zone; and passing at least a portion of said pebbles into the upper portion of said pebble heating zone.

6. The method of claim 5, wherein the ratio of said first pebble mass to said second pebble mass which is passed into said reaction zone is in the range of from 1:1 to 10:1.

7. The method of claim 5, wherein said first pebble mass is gravitated into said reaction chamber at a plurality of points spaced about and adjacent the periphery of said reaction zone; said second pebble mass is gravitated into said reaction zone at a plurality of points spaced along a line intermediate said first pebble inlets and the axis of said reaction chamber; and withdrawing reaction products from a position within the confines of said second pebble inlets.

8. An improved pebble heater apparatus which comprises in combination a vertically disposed pebble heater chamber; a pebble inlet and an effluent outlet in the upper portion of said heater chamber; a reaction chamber below said heater chamber; a plurality of horizontally disposed intersecting pear-shaped depressions in the bottom of said pebble heater chamber extending outwardly from the axis of said heater chamber to its periphery; a first pebble outlet extending downwardly from each said pear-shaped depression to the upper portion of said reaction chamber at points closer to its periphery than to its axis; a plurality of second pebble outlet conduits extending upwardly from the bottom of said pebble heater chamber at points intermediate said first pebble outlets and the axis of said heater chamber to points intermediate the ends of said heater chamber and downwardly to said reaction chamber at points intermediate said first pebble outlets and the axis of said reaction chamber; heating material inlet means in the lower portion of said heater chamber; effluent outlet means extending centrally from the upper portion of said reaction chamber; cooling gas inlet means connected to said second pebble outlet conduits at points intermediate said heater and reaction chamber; a pebble outlet in the lower portion of said reaction chamber; and an elevator extending between said pebble outlet in said reaction chamber and said pebble inlet in said heater chamber.

9. The pebble heater apparatus of claim 8, wherein said second pebble outlets are positioned on radii other than those upon which said first pebble outlets are positioned.

10. An improved pebble heater apparatus which comprises in combination a pebble heater chamber; a pebble inlet and an effluent outlet in the upper portion of said heater chamber; a reaction chamber below said heater chamber; a plurality of first pebble outlets spaced apart on a line about and within said heater chamber, said first pebble outlets being closer to the periphery than to the axis of said heater chamber and extending downwardly to the upper portion of said reaction chamber at points closer to its periphery than to its axis; a plurality of second pebble outlet conduits extending upwardly from the bottom of said pebble heater chamber at points intermediate said first pebble outlets and the axis of said heater chamber to points intermediate the ends of said heater chamber and downwardly to said reaction chamber at points intermediate said first pebble outlets and the axis of said reaction chamber; heating material inlet means in the lower portion of said heater chamber; effluent outlet means extending centrally from the upper portion of said reaction chamber; a pebble outlet in the lower portion of said reaction chamber; and an elevator extending between said pebble outlet in said reaction chamber and said pebble inlet in said heater chamber.

11. An improved method of reacting hydrocarbons which comprises passing said hydrocarbons upwardly through a hot solid contact material mass under reaction conditions in a reaction zone; passing a mass of relatively cool solid contact material across the top of said hot solid contact material mass as a cooler layer thereon; and passing resulting reaction products only through said hot solid contact material mass in said reaction zone before they are filtered through said cooler layer of contact material.

HAROLD J. HEPP.

REFERENCES CITED

The following references are of record in the file of this patent:

UNITED STATES PATENTS

| Number | Name | Date |
| --- | --- | --- |
| 2,466,005 | Crowley, Jr. | Apr. 5, 1949 |